United States Patent [19]
Rogerson et al.

[11] Patent Number: 5,378,011
[45] Date of Patent: Jan. 3, 1995

[54] AIR BAG ASSEMBLY

[75] Inventors: William E. Rogerson, Rochester Hills; Daniel F. Kopitzke, Rochester, both of Mich.

[73] Assignee: AlliedSignal Inc, Morris Township, Morris County, N.J.

[21] Appl. No.: 87,913

[22] Filed: Jul. 6, 1993

Related U.S. Application Data

[63] Continuation of Ser. No. 783,295, Oct. 28, 1991, abandoned, which is a continuation-in-part of Ser. No. 708,556, May 31, 1991, abandoned.

[51] Int. Cl.6 ............................................ B60R 21/16
[52] U.S. Cl. ........................... 280/728 R; 280/743 R; 280/743 A
[58] Field of Search ............ 280/730 R, 731, 736, 280/741, 743 A, 743 R, 728 R, 731, 732

[56] References Cited
U.S. PATENT DOCUMENTS

| | | | |
|---|---|---|---|
| 3,831,972 | 8/1974 | Allgaier et al. | 280/730 |
| 4,183,550 | 11/1980 | Sudou | 280/743 |
| 4,921,735 | 5/1990 | Bloch | 280/743 A |
| 4,966,389 | 10/1990 | Takada | 280/743 |
| 5,033,771 | 7/1991 | Miyauchi et al. | 280/730 |
| 5,064,218 | 11/1991 | Hartmeyer | 280/728 A |
| 5,071,161 | 12/1991 | Mahon et al. | 280/731 |

FOREIGN PATENT DOCUMENTS

| | | | |
|---|---|---|---|
| 0005126 | 1/1977 | Japan | 280/731 |
| 0122751 | 5/1989 | Japan | 280/743 |
| 0037058 | 2/1990 | Japan | 280/730 |
| 0074439 | 3/1990 | Japan | 280/730 |
| 2-279441 | 11/1990 | Japan | 280/743 |
| 3-82647 | 4/1991 | Japan | 280/743 A |
| 0096453 | 4/1991 | Japan | 280/730 |
| 0153440 | 7/1991 | Japan | 280/730 |
| 0197255 | 8/1991 | Japan | 280/730 |

*Primary Examiner*—Eric D. Culbreth
*Attorney, Agent, or Firm*—Markell Seitzman

[57] ABSTRACT

An air bag comprising: an upper panel (102) and a lower panel (104) both of woven material sewn together forming a generally circular structure and a tether unit or assembly (116, 118a, 118b, 130a, 130b) of the same material as one of the upper and lower panels for controlling the shape of the air bag as same is inflated by inflation gas and for absorbing a shock load created upon inflation. The tether assembly comprises a central portion (116) secured to the upper panel and only two tethers (118a, 188b) extending oppositely therefrom all of integral construction and being of sufficient strength such that each tether can separately withstand the shock load created upon inflation without being damaged. Fabric reinforcements (130a, 130b) are also provided to secure the tethers to the lower panel.

1 Claim, 4 Drawing Sheets

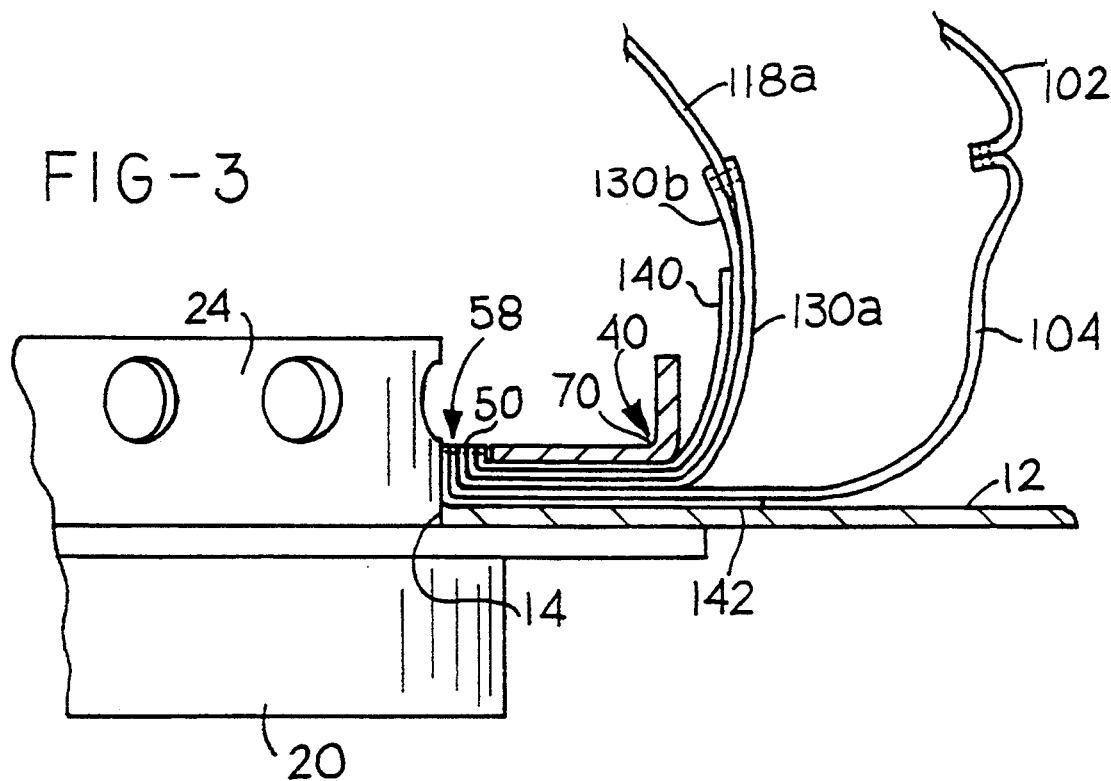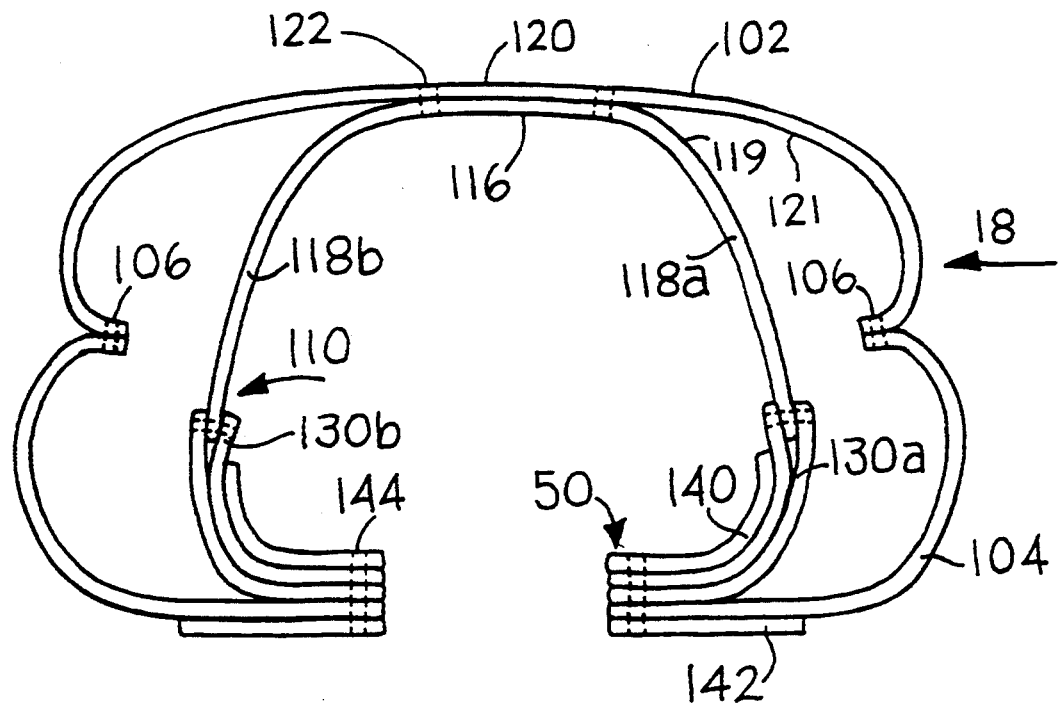

AIR BAG ASSEMBLY

This application is a continuation of application Ser. No. 07/783,295 filed Oct. 28, 1991, abandoned, which is a continuation in part of application Ser. No. 07/708,556, filed May. 31, 1991 abandoned.

BACKGROUND AND SUMMARY OF THE INVENTION

The present invention relates to an air bag assemblies and more particularly to a driver side air bag and assembly.

Various types of driver side air bag assemblies have been proposed for protecting an occupant against injury. Typically, the driver side air bag assembly comprises a housing, a gas generator, typically using a solid propellant such as sodium azide, and an air bag. The air bag is maintained in a folded configuration and secured in this configuration to the housing by a cover.

Typical of prior art air bags are those illustrated in U.S. Pat. Nos. 4,966,389 and 5,033,771 which show the use of three and four narrow strips of material used as tethers. One disadvantage of using three or four tethers arises from the fact that an air bag will occasionally deploy or inflate asymmetrically, that is, one portion of the air bag may inflate faster than another. This asymmetric deployment may occur because of the way the air bag is folded or perhaps because of the design of the gas inflator (gas generator). When an air bag inflates an initial shock load is created. In a tethered air bag, this shock load occurs when any of the tethers reaches its fully extended condition. When an air bag inflates asymmetrically the shock load may be absorbed by less than all of the tethers. In this situation the tether or tethers being subjected to this shock load could be damaged. Another disadvantage of prior art air bags which use a large number of tethers is that the additional material used for the tethers prevents the air bag from being folded compactly. This arises because each tether must be folded any number of times prior to achieving the final, folded configuration of the air bag.

It is an object of the present invention to provide an air bag assembly including an air bag which improves upon the deficiencies in the prior art.

Accordingly, the invention comprises: an air bag comprising: an upper panel and a lower panel both of woven material sewn together forming a generally circular structure; tether means of the same material as one of the upper and lower panels for controlling the shape of the air bag as same is inflated by inflation gas and for absorbing a shock load created upon inflation. The tether means comprising a central portion secured to the upper panel and only two tethers extending oppositely therefrom. The central portion and tethers being of integral construction, and being of sufficient strength such that each tether can separately withstand the shock load without being damaged, and reinforcement means secured to the lower panel and to respective ends of the each tether remote from the center portion for securing the ends of each tether relative to the lower panel. The invention also includes an assembly utilizing the air bag, a retaining ring and gas generator.

Many other objects and purposes of the invention will be clear from the following detailed description of the drawings.

BRIEF DESCRIPTION OF THE DRAWINGS

In the drawings:

FIG. 1 illustrates a cross-sectional view of an air bag assembly incorporating the features of the present invention.

FIG. 2 illustrates a top plan view of a portions of an air bag and retaining ring.

FIG. 3 is an enlarged view of a portion of the air bag assembly.

FIG. 4 illustrates a more detailed view of a tethered air bag.

DETAILED DESCRIPTION OF THE DRAWINGS

Figures 1, 2:
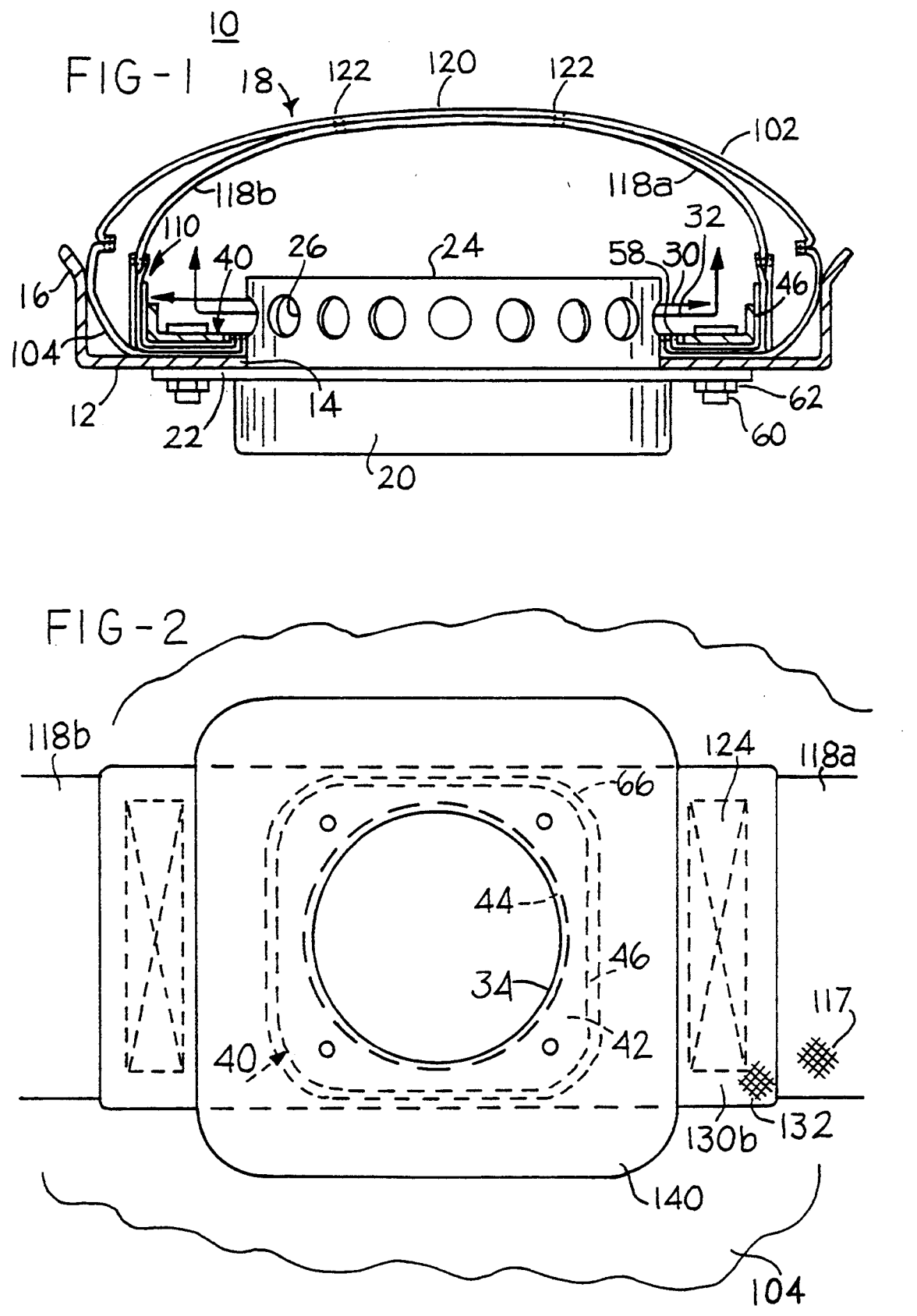
Figure 5:
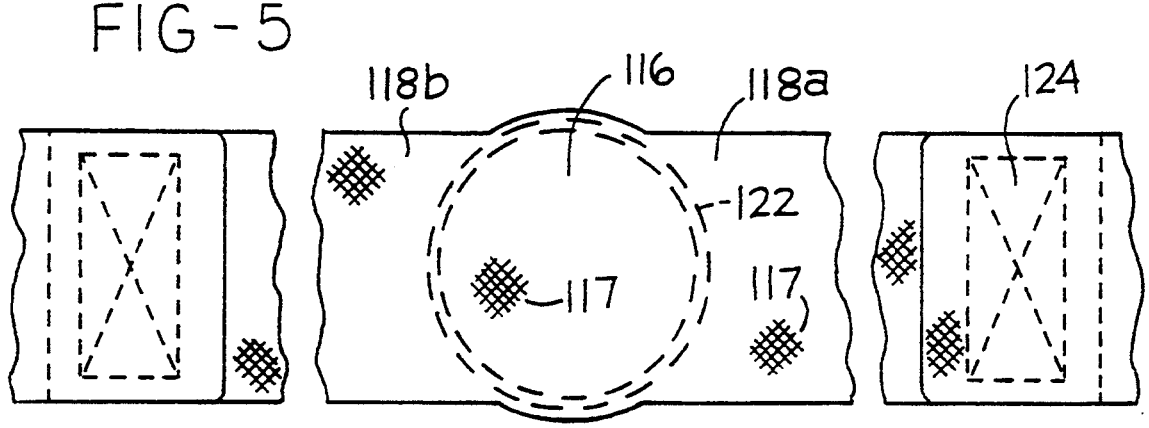
FIG. 5 illustrates a plan view of a tether unit.

FIGS. 1, 2 and 3 illustrate a driver side air bag assembly 10. The assembly 10 includes a housing 12 defining a central opening 14. The edges 16 of the housing 12 may be arcuately shaped to prevent damaging the air bag 18 (shown in a partially inflated condition) and facilitate attachment of a frangible cover (not shown). While the folded configuration of the air bag 18 is not shown, it can be appreciated that the cover will maintain the air bag in this configuration. The assembly additionally includes a gas generator shown as 20 including a flange 22. The gas generator used can be any of the various types of gas generators known in the art. These gas generators fall into two broad categories, the first uses a compound such as sodium azide and releases inflation gas as it burns, the second is a hybrid gas generator which releases stored compressed gas such as argon. The gas generator may include a cylindrical portion 24 extending into the interior of the air bag through opening 14. One or more openings 26 are located on the cylindrical portion 24 to provide exit passages for inflation gas. Arrows 30 and 32 generally show the flow of generated gas from the gas generator 20. A retaining ring 40 is provided inside the air bag 18 to clamp same against the flange 22.

The retaining ring 40 is generally square shaped, but can be circular, oval, etc. A cut-out is provided in a central bottom portion 42 to define a circular opening 44. The diameter of this opening is generally slightly larger than the diameter of a central opening 34 in the air bag 18. As will be seen the air bag includes a number of layers of material generally shown as 50, positioned below the retaining ring 40, each of which includes an opening of approximately the same diameter as opening 34. A typical diameter of opening 44 is approximately 105 millimeters while a typical diameter of the air bag opening is approximately 99 millimeters. The retainer ring includes bent up sides 46. These sides extend upwardly and intercept only a portion of the generated gases (see arrows 30 and 32) thereby deflecting this portion of the generated gases in the direction of the occupant. One goal of any air bag restraint system is to inflate the air bag in a rapid and controllable manner. It can be appreciated that the length or height of the sides 46 could be such that they extend beyond the openings 26 in the gas generator 20. In this configuration the retainer 40 deflects the total stream of generated gases perpendicularly into the air bag. This type of an arrangement may provide for a too rapid inflation of the air bag and as such, one advantage presented by the present invention is that only a portion of the generated gas stream is so deflected, which will permit a more controlled inflation of the air bag 18. Typically the height, h, of these sides 46 is sized to intercept 25 to 33 percent of the generator gas. Various fasteners such as bolt 60 and nut 62 are used to clamp the retaining ring 40 to the flange 22.

As can be seen from FIG. 2, the individual corners such as 66 of the retainer 40 are curved to prevent damaging any of the layers of material of the bag. The bottom 42 of the retainer is generally flat to provide a sufficient clamping area relative to the flange 22. As can be seen from FIG. 3, the bottom corner 70 of each side 46 is also curved. The retaining ring is designed to have an increased wall thickness and section modulus of approximately 37 mm$^3$. This is achieved by insuring that the thickness t of the retaining ring be approximately 2 millimeters. It has been found that by using a steel such as 1010/1008, the retaining ring will be sufficiently stiff to provide the required clamping force and not warp or buckle so that the clamping force is adequately distributed about the generally flat bottom of the retaining ring.

Figure 6:
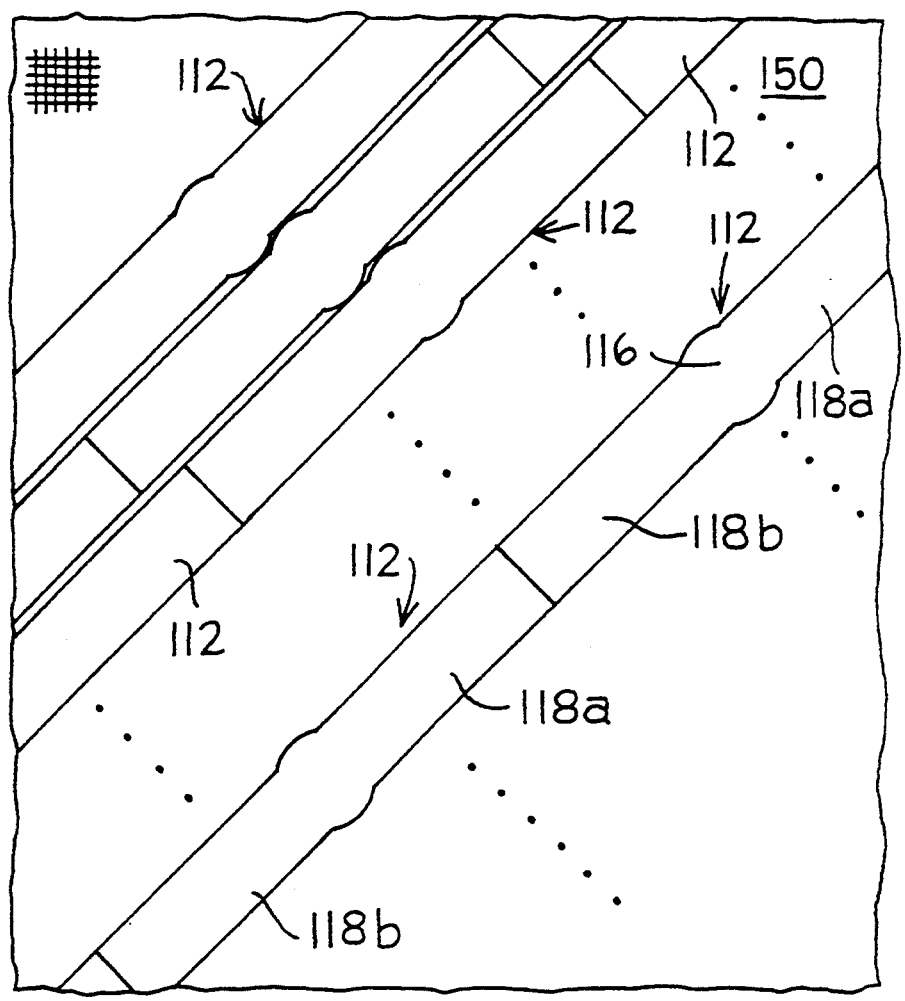
FIG. 6 illustrates a plurality of tether units prior to cutting same from a piece of air bag material.

Reference is made to FIGS. 3, 4 and 5 which illustrate in greater detail the construction of air bag 18. The air bag 18 is shown in a partial inflated condition in FIG. 4. The air bag 18 includes a generally circular outer panel 102 and generally circular lower panel 104 sewn together at a common sew line 106. These panels are arranged so that the direction of the weave 105 and 107 in each panel are on a bias (see FIG. 6) especially at the sew line 106. Such arrangement increases the strength and elasticity of the air bag. The lower panel includes the opening 34. The various panels of the air bag are constructed of a suitable soft, often woven material, such as nylon or polyester having a denier of 420 or 840. If the density of the weave is relatively open, one or more of these panels 102, 104 can be coated on an interior side with a rubber or other suitable material such as neoprene to make the air bag essentially air tight. Vent holes (not shown) may also be located in the lower panel 104, as is known in the art. In one embodiment of the air bag, the upper panel 102 is covered on its inside with neoprene or other comparable coating.

The air bag includes a tether assembly 110. The tether assembly 110 includes a tether unit 112 comprising a central, generally circular portion 116 and two tethers 118a and 118b extending oppositely therefrom. The tether assembly, as discussed below includes a plurality of reinforcement panels 130a and 130b. The central portion 116 and tethers 118a,b are fabricated as an integral unit. The central portion 116 is sewn to the center, or crown portion 120, of the outer panel 102 typically using a double lock stitch 122 formed in a circular sew pattern. The direction of the weave 117 in the center portion 116, and tethers 118a, b is arranged on a bias to the weave 105 in the upper panel. As can be appreciated the two tethers absorb a portion of the inflation forces which are generated as the air bag is inflated. As such the two tethers must absorb this force without damage. In order to provide this requisite strength each tether is approximately 5 inches (12.7 cm) wide; the diameter of portion 116 typically being 6 inches (15.24 cm). By using tethers of this construction and by using an enlarged box stitch 124 provides for sufficient strength, elasticity and force distribution to prevent damage. As can be appreciated if the tethers are too stiff they will not absorb the inflation forces and will break or cause damage to others portions of the air bag.

It is a goal to inflate any air bag symmetrically, however, this is not always achieved. If for example, the air bag were inflated unsymmetrically, and if the tethers comprised a greater number of narrower pieces of fabric, as proposed in the prior art, then during inflation one or perhaps two of the tethers may have to absorb the shock load produced during inflation. If this were to occur, the tether(s) may break. In the present invention if the air bag is inflated unsymmetrically, any damage to the tethers is minimized by virtue of the increased load sharing capability of the two tethers. In the present invention, each of the wide tethers can absorb the full shock loads. In one embodiment of the invention the tether unit, i.e., the portion 116 and tethers 118a,b are fabricated of neoprene coated 119 woven material. The neoprene lining is arranged to face the neoprene lining 121 of the upper panel 102. This arrangement has shown to be less susceptible to damage when the stitches 122 are under stress which occurs when the air bag 18 is inflated. As mentioned above, the tether assembly includes reinforcement panels 130a and 130b which are generally oblong shaped. FIG. 2 shows a rectangular (oblong) shaped panel 130b. These reinforcement panels 130a and 130b are arranged that they extend perpendicular to the sides 46 of the retaining ring 40. The ends of each tether 118a and 118b are sandwiched between ends of the each reinforcement panel 130a and 130b and sewn thereto respectively using the box stitch pattern such as 124. As can be seen in FIG. 5 the direction of the weave 132 in the reinforcement panels is oriented on the bias to each tether 118a and 118b. To protect the air bag 18 from burning or melting due the hot gases generated by the gas generator 20, it is desirable to interpose another panel 140 between the upper reinforcement panel 130b and the retaining ring. If panel 140 is coated, the coating layer faces the gas generator 20. This panel 140 functions as a heat shield protecting the reinforcement panels 130 and the lower panel 104. The lower panel 104 may also be reinforced by securing an additional layer of material about opening 34 to provide an outer reinforcement panel which is shown generally as 142. As can be seen from FIG. 3, the various pieces of material forming the various components of the air bag 18 are secured between the retaining ring and the flange 22. Each of these component panels includes a central opening such as 34 through which the gas generator 20 can be inserted. These various panels can be joined together proximate the common openings, such as by sewing along sew line 144 shown in FIG. 4.

During the assembly, the gas generator 20 is inserted within the opening 14 of the housing. As the gas generator 20 is inserted into the air bag 18, it engages the flexible air bag material 50 about each of the openings 34 and bends same inwardly about the opening 44 in the ring, such that upon securement of the gas generator 20 to the housing 12 and/or retaining ring 40 this material 50 lies between the cylindrical portion 24 and the opening 44 of the retaining ring 40 creating an air seal 58 relative to the gas generator 20. Upon generation of the inflation gases by the gas generator 20 and the pressurization of the air bag 18, this extending material 50 is squeezed against the gas generator 20 and housing 12 further enhancing its sealing qualities.

Another benefit achieved by the present invention and in particular by utilizing a tether unit 112 having two oppositely extending tethers 118a and 118b is better material utilization. This advantage can be appreciated from FIG. 6 which illustrates a large sheet of air bag material 150 upon which is superimposed the cut lines from which a plurality of tether units 112 will be cut. As can be appreciated, more tether units 112 can be cut from this piece of material with less waste than could be cut if the tether units included a central portion and three or four extending tethers. As can also be seen from FIG. 6 the various tether units 112 are laid out on the material so that each may be cut on the bias in relation to the weave pattern in the material 150.

Figure 7:
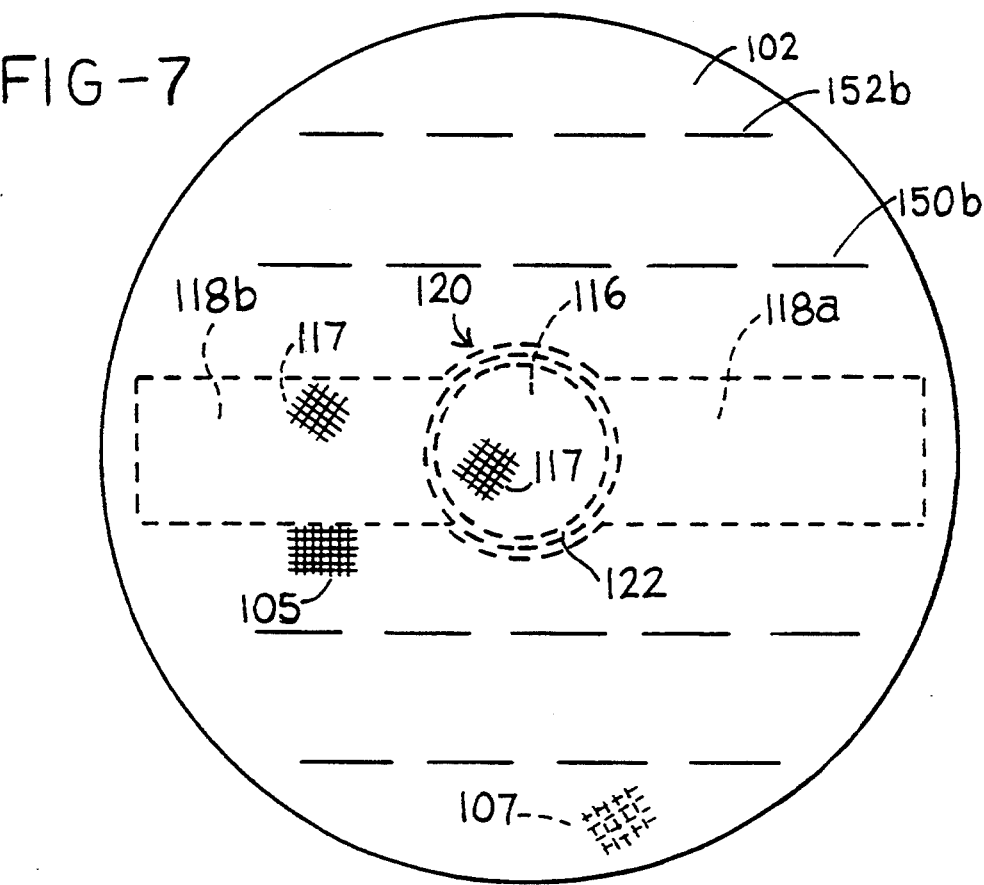
FIGS. 7 through 10 illustrate steps achieved during the folding of an air bag.
Figure 8:
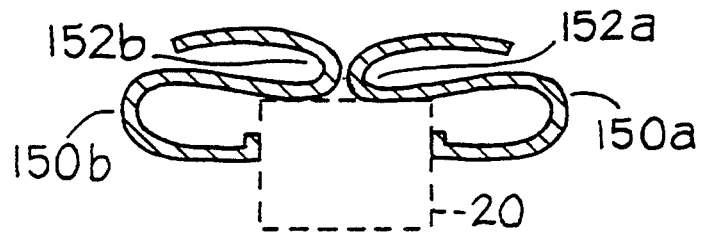
Figure 9:
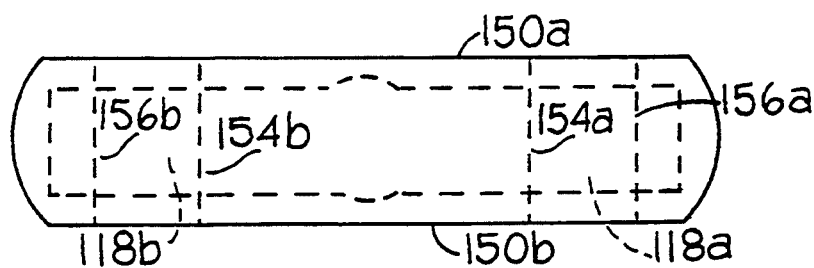
Figure 10:
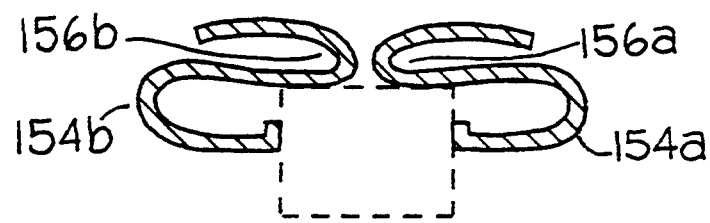

Reference is made to FIGS. 7 through 10 which illustrate a top plan view of the air bag 18 and various folded configurations. In FIG. 7 the air bag 18 has been laid flat prior to folding. Also shown are a plurality of first fold lines 150a and 150b which are arranged parallel to the tethers 118a and 118b. A set of second fold lines 152a and 152b are also shown. As known in the art there are many ways of manipulating an air bag into its compact, folded configuration. Another benefit of the present invention is shown by FIGS. 8 and 9, which illustrate a partially folded configuration achieved by first folding the air bag 18 inwardly, i.e. towards the center, about each of the fold lines 150a and 150b and then folding the air bag outwardly about fold lines 152a and 152b. As can be seen the the folded air bag material does not intersect any of the tethers 118a or 118b. This feature results in a smaller, more compact folded configuration than could be achieved with an air bag having more than two tethers. The final, folded configuration is achieved by folding the air bag shown in FIG. 9 about fold lines 154a,b and 156a,b. Even though these last folds will fold the air bag across the various tethers 118, the overall folded configuration will be smaller than that of an air bag having a greater number of tethers.

Many changes and modifications in the above described embodiment of the invention can, of course, be carried out without departing from the scope thereof. Accordingly, that scope is intended to be limited only by the scope of the appended claims.

We claim:

1. An air bag assembly comprising:
   an upper panel (102) and a lower panel (104) both of woven material sewn together forming an air bag having generally circular structure, the lower panel including a first central opening (34);
   tether means (116, 118a, 118b, 130a, 130b) of the same material as one of the upper and lower panels for controlling the shape of the air bag as same is inflated by inflation gas and for absorbing a shock load created upon inflation, the tether means comprising a central portion (116) secured to the upper panel and only two tethers (118a, 118b) extending oppositely therefrom, the central portion and tethers being of integral construction, and being of sufficient strength such that each tether can separately withstand a shock load created during inflation without being damaged, and reinforcement means (130a, 130b) secured to the lower panel (104) and to respective ends of the each tether (118a,b) remote from the center portion for securing the ends of each tether relative to the lower panel, wherein the upper panel (102) is coated on one side to reduce gas permeability and wherein the tether means is fabricated of the same material as the upper panel also being coated on one side thereof, and wherein the coated sides of the upper panel and tether means are in facing relationship and wherein the center portion (116) is secured to the upper panel (102) by sewing with stitches extending from an outer uncoated surface of the upper panel through the facing coated sides and an uncoated surface of the tether means;
   wherein the reinforcement means (130a,b) comprises a plurality of oblong shaped reinforcement panels of the same material as one of the upper and lower panels and arranged in a facing relationship;
   wherein the reinforcement means are rectangular in shape and wherein ends of each tether are sandwiched and secured between corresponding ends of two facing reinforcement panels;
   a retaining ring (40) inserted into the air bag (18) and including a second central opening (44) of diameter greater than the diameter of the first central opening (34) a gas generator (20) inserted into the air bag through the first and second central openings (34,44) and secured relative to a housing member (12), the material of the air bag proximate the first central opening (34) contacting the exterior of the gas generator (20) to form a gas seal (58) to reduce leakage of inflation gas;
   wherein the retaining ring is square shaped having a curved transition surface between a bottom and each side of the retaining ring and wherein each of the two tethers extend outwardly perpendicular to opposite sides of the retaining ring (40) and are uniformly positioned relative to the sides and upon inflation of the air bag each of the two tethers envelopes a corresponding curved transition surface and side of the retaining ring.

* * * * *